Dec. 15, 1964
V. G. HAYES
3,161,441
APPARATUS FOR CLEANING AND/OR CLEARING THE BOOT
OF AN ENDLESS CONVEYOR OR THE LIKE
Filed May 21, 1963
2 Sheets-Sheet 1
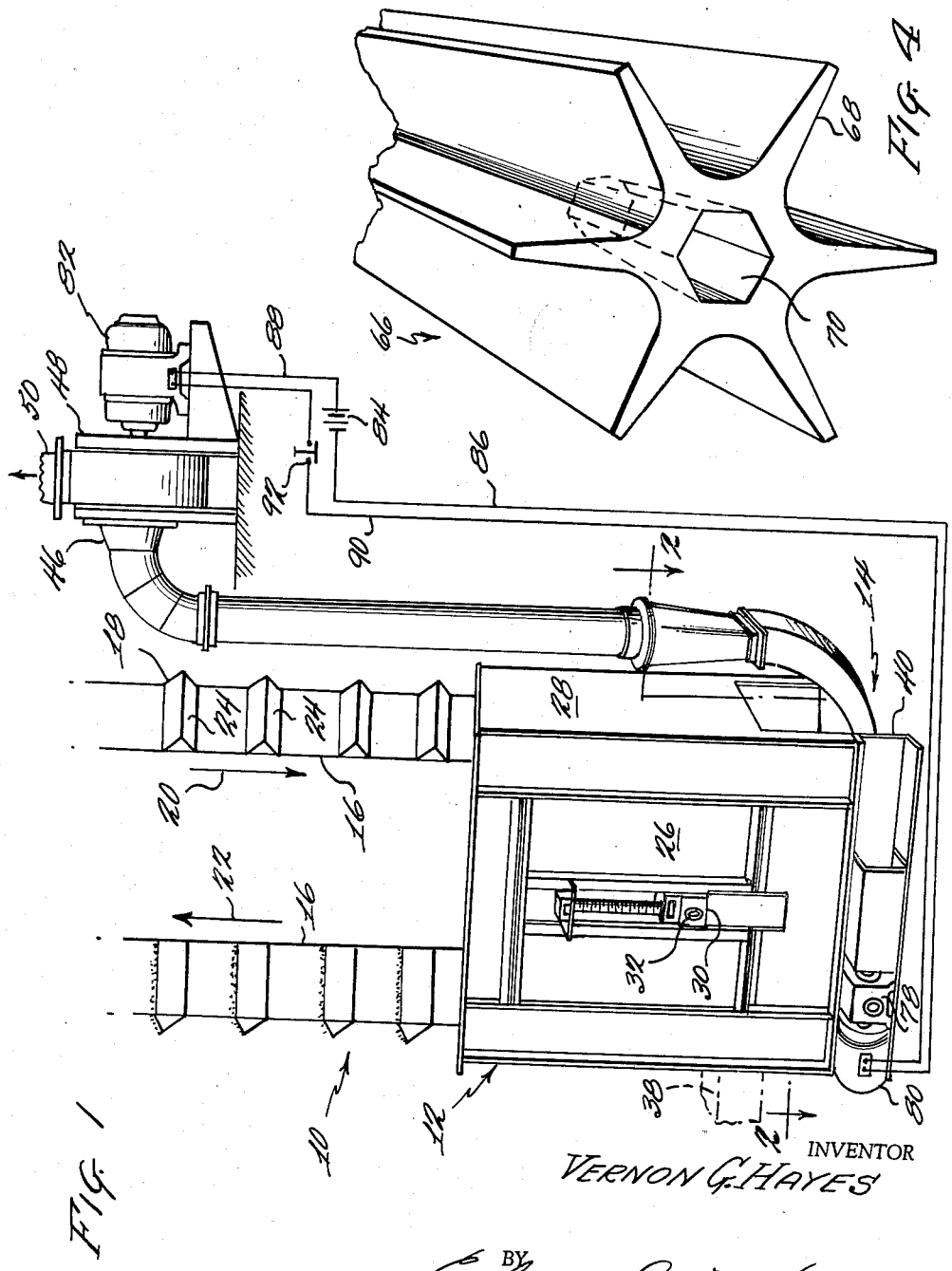
INVENTOR
VERNON G. HAYES
BY
Cushman, Darby & Cushman
ATTORNEYS

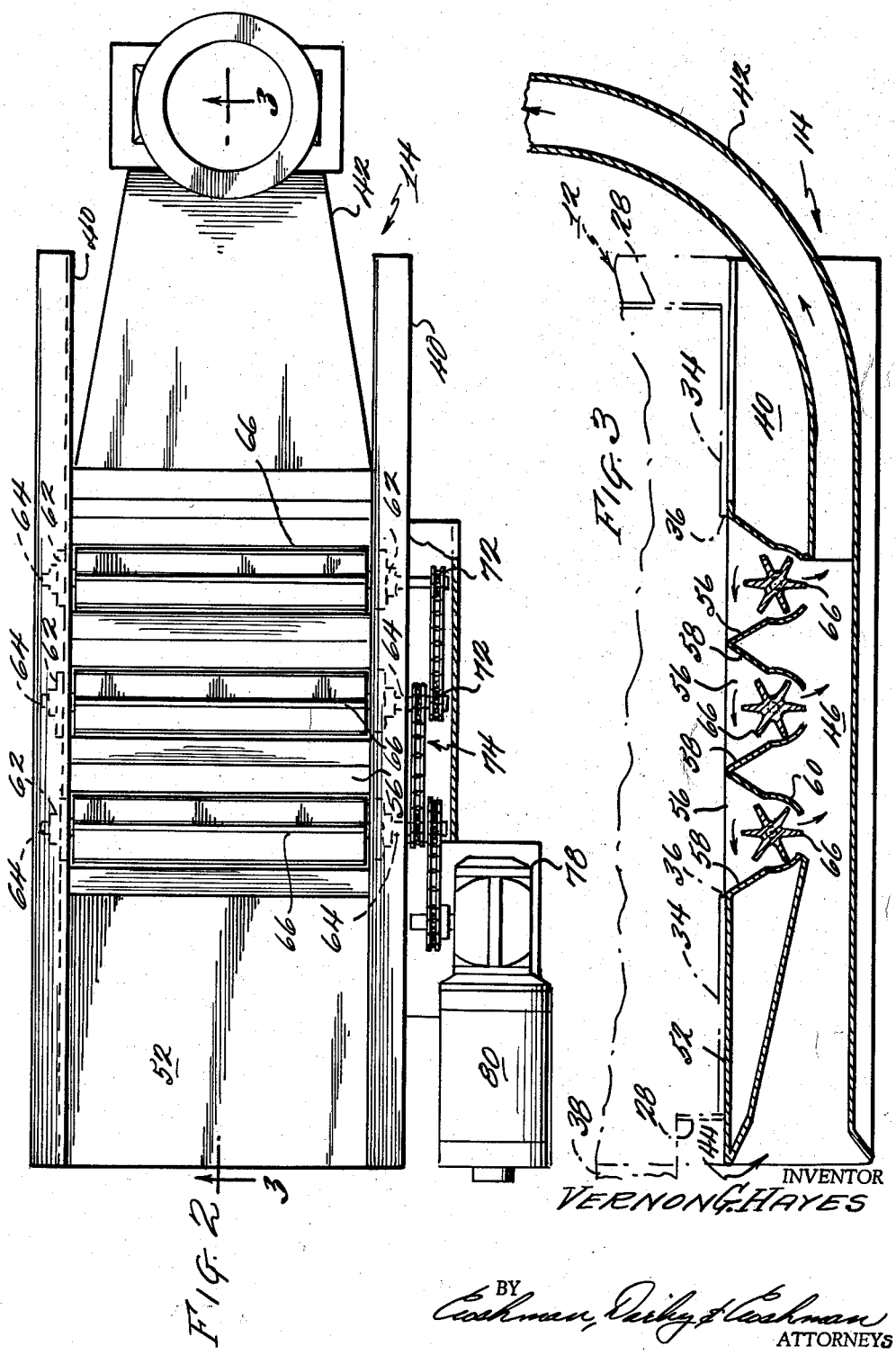

United States Patent Office 3,161,441
Patented Dec. 15, 1964

3,161,441
APPARATUS FOR CLEANING AND/OR CLEARING THE BOOT OF AN ENDLESS CONVEYOR OR THE LIKE
Vernon G. Hayes, Fort Worth, Tex., assignor to Hayes & Stolz Industrial Manufacturing Co., Inc., Fort Worth, Tex., a corporation of Texas
Filed May 21, 1963, Ser. No. 282,075
6 Claims. (Cl. 302—12)

The present invention relates generally to industrial elevator apparatus of the type used in conveying dry bulk materials such as grain, animal feeds, or the like upwardly to a point where the materials are discharged from the elevators into hoppers, bins or other distributing conveyors, and, more particularly, to an industrial elevator apparatus of the endless conveyor type with buckets or cups thereon and having a boot at its lower end from which the dry bulk materials are conveyed and further having means for removal or cleaning of residual of waste materials from the bottom of the boot after a run has been made.

In recent years, state and federal food and drug agencies have become active in inspecting equipment for use in the conveying of dry bulk materials which have an end use either as food for human consumption or for animal consumption. In the use of industrial elevators of this type, the residual dry material collecting in the bottom of the boot often times becomes contaminated and thus it has been required heretofore to carefully remove such material by hand and thoroughly clean the boot during intervals between operation of the apparatus.

Also, when the industrial elevator apparatus is used for different dry bulk materials, the residual materials falling into the bottom from the elevator or that which collects in the bottom of the boot because it cannot be picked up by the conveyor, contaminates or mixes with the new bulk materials when it is desired to change from one material to another. This is highly undesirable and provides for considerable waste of material. In either siutation, the food and drug agencies of state and federal governments require that the boots of the elevators be continually inspected and cleaned when necessary in order to remove residual waste or contaminated materials.

An important object of the present invention is to provide an apparatus for elevating dry bulk materials, the apparatus including an endless conveyor means having buckets or cups thereon, the end of the endless conveyor means extending into the boot and the boot having means selectively operable for automatically cleaning the same at least during an interval when the conveyor means is inoperative.

Another important object of the present invention is to provide an improved means for cleaning a boot of an elevator for dry bulk materials, the means being automatically operable to remove all of the residual from the boot thereby eliminating any chance of the residual from one operation to contaminate or mix with the bulk materials of a subsequent operation.

A further important object of the present invention is to provide an improved means for cleaning and/or clearing the bottom of a boot for a dry bulk material elevator conveyor which utilizes mechanical means for transferring the bulk material from the boot into a fast moving air stream whereby the residual bulk material and any material which may contaminate the same is completely removed from the boot with no chance of clogging the bottom of the boot during operation of the elevator conveyor.

Ancillary to the immediately preceding object, it is a further object of the invention to provide efficient means for unclogging a clogged elevator conveyor even while the elevator is operating.

Still a further object of the present invention is to provide an apparatus for cleaning or clearing the bottom of a boot of residual material, the apparatus being capable of supporting the boot and at least a portion of the weight of the elevator extending into the boot.

A still further object of the present invention is to provide an improved means for cleaning or clearing the boot of a bulk material elevator, the means including mechanical means for transferring the material from the boot to an air stream which in turn elevates the material to a point of discharge from where the material may be piped back into an inlet on the upside of the elevator or directed into bags or storage vessels as desired.

These and other objects and advantages of the present invention will appear more fully by reference in the following specification, appended claims, and the accompanying drawings in which:

FIGURE 1 is a perspective view of the apparatus of the present invention illustrating the improved cleaning or clearing means supporting the boot of an endless bucket type conveyor, a portion of the conveyor being omitted for purposes of clarity;

FIGURE 2 is a top plan view of the improved cleaning means taken substantially on the line 2—2 of FIGURE 1, the boot and endless bucket type conveyor being omitted for purposes of clarity;

FIGURE 3 is a sectional view taken substantially on the line 3—3 of FIGURE 2, a portion of the boot being shown in dot-dash lines; and FIGURE 4 is an enlarged perspective of one of the vane type feeders used for feeding residual material from the bottom of the boot.

Referring now to the drawings wherein like character or reference numerals represent like or similar parts, and more particularly to FIGURE 1, the present invention includes an endless conveyor elevator means generally designated by the numeral 10, a boot generally designated by the numeral 12, and means for removing residual material from the bottom of the boot generally designated by the numeral 14. The endless conveyor elevator means 10 includes an endless belt or chain means 16 of known construction on which is carried a plurality of buckets 18 for scooping dry material from a source of supply within the boot 12. As shown in FIGURE 1, the endless belt or chain means 16 has a downwardly extending vertical run indicated by the arrow 20 and an upwardly extending vertical run indicated by the numeral 22.

The buckets 18 on the downwardly extending run will be empty and have the open end 24 facing downwardly. As the buckets 18 go into the boot 12 and around the base pulley (not shown), they pick up the dry bulk material within the boot 12 and ascend upwardly along the vertical run 22 to a point where the material is discharged.

The dry bulk materials may be discharged over the head pulley (not shown) of the conveyor means 10 or it may be discharged by suitable means not shown for dumping the buckets 18 as they pass a suitable receptacle or chute.

The boot 12 is generally of rectangular shape open at the top and includes side walls 26 and end walls 28. Each of the opposed side walls 26 are adapted to support a bearing block 30 for a shaft 32 which in turn supports the lower or base pulley (not shown) of the bucket elevator conveying means 10. As best shown in FIGURE 3, the boot 12 is provided at its lower end with a floor or bottom 34 having an enlarged rectangular shaped opening 36. An inlet 38 shown schematically may be provided in one of the end walls 28 so that dry bulk material can be transferred into the boot 12 where it is picked up by the buckets 18 of conveyor means 10. It is preferable that the inlet 38 be in the end wall 28 adjacent the upwardly extending run 22 of the conveyor means 10.

Cleaning or clearing means 14 for removing residual or waste contaminated materials from the bottom of the boot 12 includes a pair of U-shaped structural members 40 supporting one portion of an air stream duct 42 therebetween. The duct 42 has an inlet 44 which leads into a venturi portion 46 of reduced dimensions positioned beneath the opening 36 in the bottom of the boot 12. Duct 42 extends upwardly adjacent the opposite end 28 of the boot 12 and has an outlet end 46 in which is connected a suction fan 48. The suction fan 48 may be of the centrifugal type and has an outlet 50 thereon which can either extend back to the inlet 38 of the boot or to a point of discharge where the materials may be discharged into receptacles, bins, or the like.

A covering 52 is placed between the U-shaped structural members 40. It will be noted that communicating with the opening 36 of the boot 12 is a plurality of chutes 56 extending completely across the opening 36. Each of the chutes 56 is provided with a pair of opposed downwardly and inwardly sloping walls 58 terminating in opposed space arcuate portions 60 at their lower ends where they open into the venturi portion of the duct 42. Opposed bearing blocks 62 supported on the outer surface of the structural U-shaped members 40 rotatably support stub shafts 64 carrying a plurality of rotatable vane type feeders 66. There is one vane type feeder provided in the lower end of each chute 56, the vane type feeder 66 (FIGURE 4) being provided with radially extending vanes arranged to cooperate closely with the arcuate portion 60 of the sloping walls 58. Each vane type feeder 66 is provided with a non-circular bore 70 in each end thereof in which is received the complementary shaped portion of the stub shafts 64.

The stub shafts 64 on one side of the unit are provided with sprockets 72 over which pass a chain drive generally designated at 74 whereby all of the vane type feeders 66 are rotatable in the same direction at the same speed. The chain drive 74 is operatively connected by a gear reduction unit 78 driven by an electric motor 80. Upon energization of the electric motor 80 the reduction unit 78 is caused to rotate and drive the chain drive 74 to thereby rotate each of the feeders 66 at the same speed in the direction of the arrows shown in FIGURE 3.

When the vane type feeders 66 are not rotating they in effect provide a closed valve structure for the ducts so that dry bulk materials within the boot do not pass by gravity through the opening 36 and chutes 56 into the duct 42 where it might have a tendency to build up and clog the conveyor means 10 or cleaning and clearing means 14.

The suction fan 48 is rotated by an electric motor 82. The electric motor 82 is simultaneously energized with the electric motor 80 so that the vane type feeders 66 rotate and transfer materials out of the respective chutes 56 into the duct 42 which has a stream of air flowing therethrough. In order to operate the electric motors 80 and 82 respectively, a source of electrical power 84 is connected to the motor 80 by means of the conductor 86 and to the motor 82 by means of the conductor 88. Another connector 90 extending from the motor 80 to the motor 82 is provided with a selectively operable switch 92. When the switch 92 is closed, the electrical circuit is complete to both motors causing the suction fan 48 and the rotary feeders 66 to simultaneously operate. If desired, the switch 92 may be operated by a time control unit so as to periodically clean the bottom of the boot 12. The time control unit would be used on installations where the dry bulk materials are of the type which would tend to clog the bottom of the boot 12; thus, periodic cleaning of the boot is accomplished. On the other hand, when the switch 92 is manually operable, it can be closed when desired and especially when changing from one material to another so that it can be cleaned during the interval between the emptying of the boot and the refilling of the boot with the material to be elevated.

While the objects and advantages of the apparatus of the present invention have been effectively accomplished by the disclosure in the specification and drawings, it will be understood that the apparatus is such that it may be subjected to some changes and modifications without departing from the scope of the invention involved. Further, it will be noted that the boot cleaning means 14 provides a unit which has a low total height and can be utilized to support the boot 12 and at least a portion of the weight of the elevator conveyor 10. Also, extremely successful results have been accomplished by coordinating the transfer of the bulk materials from the boot 12 by the mechanical means, namely the vane type feeders 66 into a fast moving stream of air in the venturi portion 46 of duct 42 caused by the suction fan 48. Such a cooperation between the mechanical means of movement of the material and the fluid means of movement of the material provides for excellent cleaning and/or clearing of the boot 12 when it is so desired to clean or clear the same.

The terminology used in the specification is for the purposes of description of not limitation, the scope of the invention being defined in the claims.

What is claimed is:

1. In an apparatus for elevating dry bulk materials, the apparatus including a boot for receiving the dry bulk materials and an elevator feeder extending into the boot for receiving and elevating dry materials therefrom, the improvement in means for clearing waste material from the bottom of the boot comprising: at least one chute extending downwardly from beneath the boot and communicating with the interior thereof; a rotatable vane type feeder extending across said chute and rotatable on a horizontal axis, said vane type feeder permitting passage of material through said chute when rotating; a duct communicating with the lower end of said chute, said duct having one end open to atmosphere; suction means attached to the other end of said duct, said suction means having a discharge for discharging material received in said duct from said boot when said vane type feeder is rotating.

2. The apparatus as claimed in claim 1 in which said chute has downwardly and inwardly sloping walls therein and said vane type feeder being positioned within the lower end of said chute and having a plurality of radially extending vanes arranged to cooperate with the sloping side walls of said chute.

3. The apparatus as claimed in claim 1 including means to simultaneously operate said rotatable vane type feeder and said suction means whereby material in the bottom of said boot is moved by said vane type feeder through said chute into said duct and said suction means withdraws the material received in said duct.

4. The apparatus as claimed in claim 1 including an electric motor for rotating said vane type feeder and wherein said suction means includes a suction fan in said duct and an electric motor to operate said suction fan.

5. The apparatus as claimed in claim 4 including means to simultaneously operate both of said electric motors.

6. The apparatus as claimed in claim 4 wherein said duct extends upwardly alongside of the boot to a position where the other end of the same is at an elevation above said boot and said suction fan is positioned in said duct at an elevation above said boot.

References Cited by the Examiner

UNITED STATES PATENTS

| | | | |
|---|---|---|---|
| 1,710,279 | 4/29 | Waddell | 198—231 |
| 2,619,218 | 11/52 | Krehbiel | 198—231 |
| 2,641,357 | 6/53 | Jones | 198—231 |

SAMUEL F. COLEMAN, *Acting Primary Examiner.*

ANDRES H. NIELSEN, *Examiner.*